US006861982B2

(12) United States Patent
Forstrom et al.

(10) Patent No.: US 6,861,982 B2
(45) Date of Patent: Mar. 1, 2005

(54) SYSTEM FOR DETERMINING POSITION OF AN EMITTER

(75) Inventors: Howard Scott Forstrom, North Haledon, NJ (US); Dennis D. McCrady, Holmdel, NJ (US); Lawrence J. Doyle, Hazlet, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 588 days.

(21) Appl. No.: 09/930,165

(22) Filed: Aug. 16, 2001

(65) Prior Publication Data

US 2003/0092448 A1 May 15, 2003

(51) Int. Cl.[7] .............................. G01S 1/24; G01S 3/02
(52) U.S. Cl. ...................... 342/387; 342/463; 342/465
(58) Field of Search ................................ 342/387, 465, 342/457, 463

(56) References Cited

U.S. PATENT DOCUMENTS

| | | | |
|---|---|---|---|
| 3,848,254 A | * 11/1974 | Drebinger et al. | ........ 342/457 |
| 3,886,553 A | 5/1975 | Bates | |
| 4,665,404 A | 5/1987 | Christy et al. | |
| 5,109,390 A | 4/1992 | Gilhousen et al. | |
| RE34,004 E | 7/1992 | Rogoff et al. | |
| 5,293,642 A | 3/1994 | Lo | |
| 5,317,323 A | 5/1994 | Kennedy et al. | |
| 5,469,409 A | * 11/1995 | Anderson et al. | ............. 368/10 |
| 5,579,321 A | 11/1996 | Van Grinsven et al. | |
| 5,663,990 A | 9/1997 | Bolgiano et al. | |
| 5,774,876 A | 6/1998 | Wooley et al. | |
| 5,912,644 A | 6/1999 | Wang | |
| 5,982,324 A | 11/1999 | Watters et al. | |
| 6,040,800 A | 3/2000 | Raith et al. | |
| 6,166,691 A | 12/2000 | Lindqvist | |
| 6,310,576 B1 | * 10/2001 | Johnson | ..................... 342/465 |
| 6,518,921 B1 | * 2/2003 | Irvin et al. | .................. 342/387 |
| 2001/0030625 A1 | * 10/2001 | Doles et al. | ................. 342/387 |

FOREIGN PATENT DOCUMENTS

| | | | |
|---|---|---|---|
| EP | 0 964 265 A2 | 12/1999 | |
| EP | 1073216 A2 * | 1/2001 | ............ H04B/7/26 |
| EP | 1 289 172 A2 | 3/2003 | |
| GB | 2 316 823 A | 3/1998 | |
| GB | 2353671 A * | 2/2001 | ............ H04B/7/26 |
| WO | WO01/10154 A1 | 2/2001 | |
| WO | WO01/15340 A1 | 3/2001 | |

OTHER PUBLICATIONS

Robert A Scholtz, "The Origins of Spread–Spectrum Communications", IEEE Transactions on Communications, vol. COM–30, No 5, 1982.

(List continued on next page.)

*Primary Examiner*—Gregory C. Issing
(74) *Attorney, Agent, or Firm*—Edell, Shapiro & Finnan, LLC

(57) ABSTRACT

The position of a non-cooperating emitter is determined by detecting a signal from the emitter at three or more receiver communication devices positioned at different locations. The receiver communication devices determine respective detection times of the emitted signal in respective local time reference frames. To establish a common time reference frame for the emitted signal detections, each receiver communication device exchanges time synchronization signals with a reference communication device. Since any of the receiver communication devices and the reference communication device may be mobile, the signal exchange allows each receiver communication device to accurately determine the signal propagation time between itself and the reference communication device and factor the signal propagation time into an accurate adjustment of the local time reference frame. Using trilateration, the position of the emitter is determined from known positions of the receiver communication devices and the emitted signal detection times from the receiver communication devices.

95 Claims, 4 Drawing Sheets

OTHER PUBLICATIONS

Benjamin B. Peterson, et al., "*Spread Spectrum Indoor Geolocation*", vol. 45, No. 2, pp. 97–102, 1998.

U.S. Appl. No. 09/365,702, "*Method and Apparatus for Determining the Position of a Mobile Communication Device Using Low Accuracy Clocks*" Dennis McCrady, et al., filed Aug. 2, 1999.

U.S. Appl. No. 09/777,625, "*Method and Apparatus for Determining the Position of a Mobile Communication Device*", Dennis McCrady, et al., filed Feb. 6, 2001.

Dennis D. McCrady, "Mobile Ranging Using Low–Accuracy Clocks", IEEE Transactions on Microwave Theory and Techniques, VOL. 48, No. 6, Jun. 2000, pp. 951–957.

* cited by examiner

SYSTEM FOR DETERMINING POSITION OF AN EMITTER

BACKGROUND OF THE INVENTION

1. Field of Invention

The present invention relates to a system for estimating the position of a device that emits a detectable signal and, more particularly, to an emitter position estimating system that accurately determines the position of an emitter using time-synchronized receivers that employ cost effective, low accuracy clocks.

2. Description of the Related Art

The need to determine the position of an emitter can arise due to many different reasons, in diverse environments, and under highly variable physical conditions. For example, in search and rescue operations, the need may arise to locate an intentionally transmitted beacon signal, or a radio transmission believed to originate from a party requiring assistance. In both civilian and military environments, it may be necessary to locate the source of intentional or unintentional transmissions that are causing interference with authorized transmissions. Furthermore, the ability to determine the source of unauthorized transmissions allows the position of hostile equipment and personnel to be identified. The need to locate emitters arises in vastly different physical environments ranging from deserts, mountainous regions, and dense forests, to urban environments, and even extends to physical environments undersea and in space. In addition, emitters to be located in these environments may be fixed or mobile, traveling slowly or at high speed.

Techniques are known for estimating the position of a communication device using direct communication via an established protocol. These techniques measure the range between devices and rely upon a precise determination of the signal propagation time between the devices. The signal propagation time can be derived by knowing the transmission and reception times of one or more ranging signals traveling along a direct path between the devices. For example, the well-known global positioning system (GPS) relies on measurement of the one-way propagation time of signals sent from each of a set of satellites to a receiving device in order to determine the range to each satellite and the position of the receiving device. Position estimating systems that rely upon a two-way, round-trip ranging signal scheme are described in U.S. patent application Ser. No. 09/365,702, filed Aug. 2, 1999, entitled "Method and Apparatus for Determining the Position of a Mobile Communication Device Using Low Accuracy Clocks" and U.S. patent application Ser. No. 09/777,625 filed Feb. 6, 2001, entitled "Methods and Apparatus for Determining the Position of a Mobile Communication Device", the disclosures of which are incorporated herein by reference in their entireties. In the ranging schemes described in these applications, a master mobile communication device transmits outbound ranging signals to plural reference communication devices which respond by transmitting reply ranging signals that indicate the position of the reference radio and the signal turn around time (i.e., the time between reception of the outbound ranging signal and transmission of the reply ranging signal). Upon reception of the reply ranging signal, the master radio determines the signal propagation time, and hence range, by subtracting the turn around time and internal processing delays from the elapsed time between transmission of the outbound ranging signal and the time of arrival of the reply ranging signal. The accuracy of the position determined by these systems depends largely on the accuracy with which the receiving devices can determine the time of arrival of the ranging signals traveling along a direct path between the devices.

Where an emitter is not directly cooperating with devices attempting to determine the emitter's position, the task of estimating the position of an emitter device is complicated by the fact that the emitter must be located without the benefit of two way communications. Of the existing techniques for determining the position of a non-cooperating emitter, the simplest and most common is the use of azimuth angle or bearing angle to track the emitter and determine its position. Unfortunately, this technique is reliable and accurate only if the transmitter is fixed and the emitted signal is sustained over a sufficient period of time to be tracked. Another technique uses multiple antennas to determine angle and range information. A recent adaptation of this technique is to use an antenna array and beam steering instead of multiple single antennas. Although an antenna array provides an improvement over using multiple antennas, it requires a bulky phased array antenna which increases size and cost and decreases mobility. Other existing techniques use extensive post processing to reduce a wealth of data into position information; however, these techniques also involve bulky and cumbersome equipment and/or fail to provide real time solutions.

As a whole, existing approaches suffer from a multitude of deficiencies which include: the inability to detect a broad range of emitted signal types; the inability to adapt to changes and advancements in technology; and the inability to support the demands imposed by varying operational environments, such as the need to operate under extreme weather conditions and in highly obstructed, multipath environments. Existing techniques rely upon specialized equipment that cannot leverage off the existing base of commercially available hardware and software. Furthermore, existing solutions often require bulky equipment for post processing and/or multiple antennas or antenna arrays which result in systems with increased size, power and weight, thereby increasing costs, while limiting mobility and the environments in which they can be used. In addition, existing approaches, due to their inability to periodically synchronize to a common time frame of reference, require high accuracy clocks to meet operational requirements for position accuracy, thereby significantly increasing costs. Existing solutions often require significant post processing and are unable to provide a high degree of mobility as well as real-time position estimation capability.

A strong need exists for a physically compact emitter position estimating system that can detect a variety of emitted signal types, can provide highly accurate real time solutions, is highly mobile, can detect fixed and highly mobile emitters, and can operate in physically diverse, severely obstructed, multipath environments. Such an emitter position estimating system should be able to locate an emitter without tracking the emitter over time, and should not require use of multiple antennas, antenna arrays, or directed antenna. The system would preferably employ an approach that allows the use of less expensive, commercially available hardware and software, and not require extensive post processing. Furthermore, it would be desirable for the emitter position estimating capabilities to be transparently integrated within devices supporting multipurpose communication related capabilities, thereby allowing widespread deployment at minimal incremental cost.

An emitter position estimating system that can meet these needs would be of great benefit in a variety of applications such as locating sources of intentional or unintentional interference, locating criminal and/or hostile force equipment, and facilitating search and rescue missions. Furthermore, such an emitter position estimating system, can bemused as part of a high performance, cost effective tracking system. Such a tracking system would be less expensive to build and deploy, and the complexity of deployed emitter devices would be greatly reduced, due to relaxed performance requirements, thereby reducing size, power requirements, size, and cost of deployed emitter devices, while increasing compatibility with deployed emitters produced by different vendors. Such a tracking system can be used to locate any style of beacon device or emitter deployed.

More generally, such a tracking system can be used to track the position of personnel and resources located both indoors or outdoors, including but not limited to: police engaged in tactical operations; firefighters located near or within a burning building or forest fire; medical personnel and equipment in a medical facility or en route to an emergency scene, including doctors, nurses, paramedics and ambulances; and personnel involved in search and rescue operations. An accurate, efficient emitter position estimating system would enhance capabilities to track and locate high-value items, including such items as personal computers, laptop computers, portable electronic devices, luggage, briefcases, valuable inventory, and automobiles. In urban environments, where conventional position estimating systems have more difficulty operating, it would be desirable to more reliably track fleets of commercial or industrial vehicles, including trucks, buses and rental vehicles. Tracking of people carrying an emitter is also desirable in a number of contexts, including, but not limited to: children in a crowded environment such as a mall, amusement park or tourist attraction; location of personnel within a building; and location of prisoners in a detention facility. The capability to accurately and efficiently determine the position of an emitter also has application in locating the position of cellular telephones. The capability to determine the position of cellular telephones could be used to pinpoint the position from which an emergency call has been made. Such information could also be used to assist in cell network management (for example, by factoring each mobile communication device's position into message routing algorithms).

SUMMARY OF THE INVENTION

Therefore, in light of the above, and for other reasons that become apparent when the invention is fully described, an object of the present invention is to determine the position of both fixed and mobile emitters in real time with high accuracy.

A further object of the present invention is to eliminate the need for antenna arrays and directed antennas in an emitter position estimating system, thereby facilitating development of an emitter position estimating system that is physically compact and highly mobile.

Yet a further object of the present invention is to minimize design and production costs associated with an emitter position estimating system by using commercially available hardware and software such as inexpensive, low accuracy clocks, spread spectrum communication hardware and proven and efficient network architecture and protocols.

A still further object of the present invention is to transparently integrate an emitter position estimating system within compact, handheld or portable, multi-purpose communication devices, thereby allowing widespread deployment at minimal incremental cost.

Another object of the present invention is to actively or passively support detection and position estimation of emitters without disrupting simultaneous voice and/or data communication services supported by the device.

Yet another object of the present invention is to determine the physical position of an emitter in a variety of environments, even under severe multipath conditions, such as urban areas and inside buildings, by minimizing the effects of interference caused by multipath signal propagation.

Still another object of the present invention is to detect the position of an emitter based upon a single brief transmission, without requiring prolonged tracking of the emitted signal to determine the position of the emitter.

Still another object of the present invention is establish a trilateration based position estimating capability that is operationally independent of the signal detection requirements and signal detection technology used to physically detect emitted signals.

It is a further object of the present invention to support an emitter position estimating system that can be integrated within a resource tracking system for locating and tracking deployed emitters.

The aforesaid objects are achieved individually and in combination, and it is not intended that the present invention be construed as requiring two or more of the objects to be combined unless expressly required by the claims attached hereto.

In accordance with the present invention, an emitter position estimating system permits time of receipt of emitter signals detected by physically separate and distinct receiver communication devices to be accurately established relative to a common time reference frame, thereby allowing the position of an emitter to be established using trilateration techniques. The approach employs two-way transmission of spread spectrum time synchronization signals between receiver communication devices and a common time reference communication device to establish a common synchronized time frame of reference. This time synchronization process allows the position of an emitter to be determined with a high degree of accuracy using devices which employ cost effective and relatively low accuracy clocks.

Upon detection of a signal, each receiver communication device performs a time synchronization process with a pre-designated or commonly negotiated reference communication device and then synchronizes the time of signal detection to a common time frame of reference established by the reference communication device. Having time synchronized the detected signal, the receiver communication device transmits a signal detection notification to a trilateration processor. The trilateration processor receives and correlates signal detection notifications from multiple receiver communication devices based upon time of receipt and/or signal content. If three or more signal detection notifications can be correlated, trilateration processing techniques are used to calculate the position of the emitter based upon the respective synchronized detection times and the positions of the respective receiver communication devices at the time of detection.

The invention disclosed herein provides a highly accurate emitter position estimating system capable of locating both fixed and mobile emitters, in real time, regardless of the nature of the signal emitted. Detection of emitted signals can be performed by modularly replaceable software and/or hardware units that may include state-of-the-art, commercial off the shelf (COTS) software and/or hardware, digital signal processors (DSP), field programmable gate arrays (FPGA), and application specific integrated circuits (ASICS). These modularly replaceable units allow a receiver device to be specifically tailored and/or reprogrammed, as necessary, to meet specific operational signal detection requirements, and to modularly adapt to changes in signal transmission and/or detection techniques. The emitter position estimating capability disclosed herein as part of the present invention, however, is independent of the emitted signal detection technology used by the respective receiver devices. The position estimating technique disclosed herein as part of the present invention remains effective for estimating the position of emitted signal regardless of the signal detection technologies used.

The invention minimizes design and manufacturing costs by maximizing use of commercially available hardware and software such as inexpensive, low accuracy clocks, spread spectrum communication hardware, and proven, efficient network protocols. The emitter position estimating capabilities described herein can be transparently integrated within compact, handheld or portable, multi-purpose communication devices, thereby allowing widespread deployment at minimal incremental cost. Detection and position estimation of emitters can be performed with either the active or passive support of a deployed device, without disrupting simultaneous voice and/or data communication services supported by the device. The need for multiple antennas is eliminated by the use of multiple signal detection receiver communication devices. Receiver device, reference device, and trilateration processor capabilities can be performed by separate physical devices, or within a single device.

The need for high accuracy clocks is eliminated through the use of a very precise time synchronization process that allows a common time frame of reference to be established across the receiver communication devices. Receiver devices are synchronized using a two-way time of arrival (TOA) processing scheme that employs techniques for determining the precise round trip transmission time between a receiver communication device and the time reference communication device, thereby allowing a receiver device to be precisely time synchronized with the reference device. State-of-the-art spread spectrum chipping rates and bandwidths reduce multipath interference, while taking advantage of existing hardware and software to carry out a portion of the TOA processing. Leading edge curve fitting can be used to accurately locate the leading-edge of an acquisition sequence in the synchronization signal in order to further reduce effect of multipath interference on TOA estimates. Frequency diversity can be used to orthogonalize multipath interference with respect to the direct path signal, wherein an optimal carrier frequency and phase can be identified and used to estimate the TOA to minimize the impact of multipath interference.

The emitter position estimation technique of the present invention is useful in locating any object that emits a detectable electromagnetic signal. Any signal that can be detected by three or more receiver devices and correlated, including the briefest of transmission signals, provides the basis for determining the position of the emitter. This powerful capability allows emitters to be located without extensive tracking. The technique has a wide variety of applications in support of both commercial and military operations that require the position estimation of the source of an electromagnetic transmission, such as locating distress beacons and other transmissions in support of search and rescue operations; locating the source of intentional or unintentional transmissions causing interference with authorized transmissions; locating/tracking hostile equipment and personnel based upon associated electronic emissions; and tracking emitters deployed as part of a resource tracking system.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

The following detailed explanation of the figures and of the preferred embodiments of the present invention reveal the methods and apparatus of an emitter position estimating system capable of accurately determining the position of an electromagnetic signal emitter using time-synchronized receiver radios equipped with cost effective, low accuracy clocks.

Figure 1:
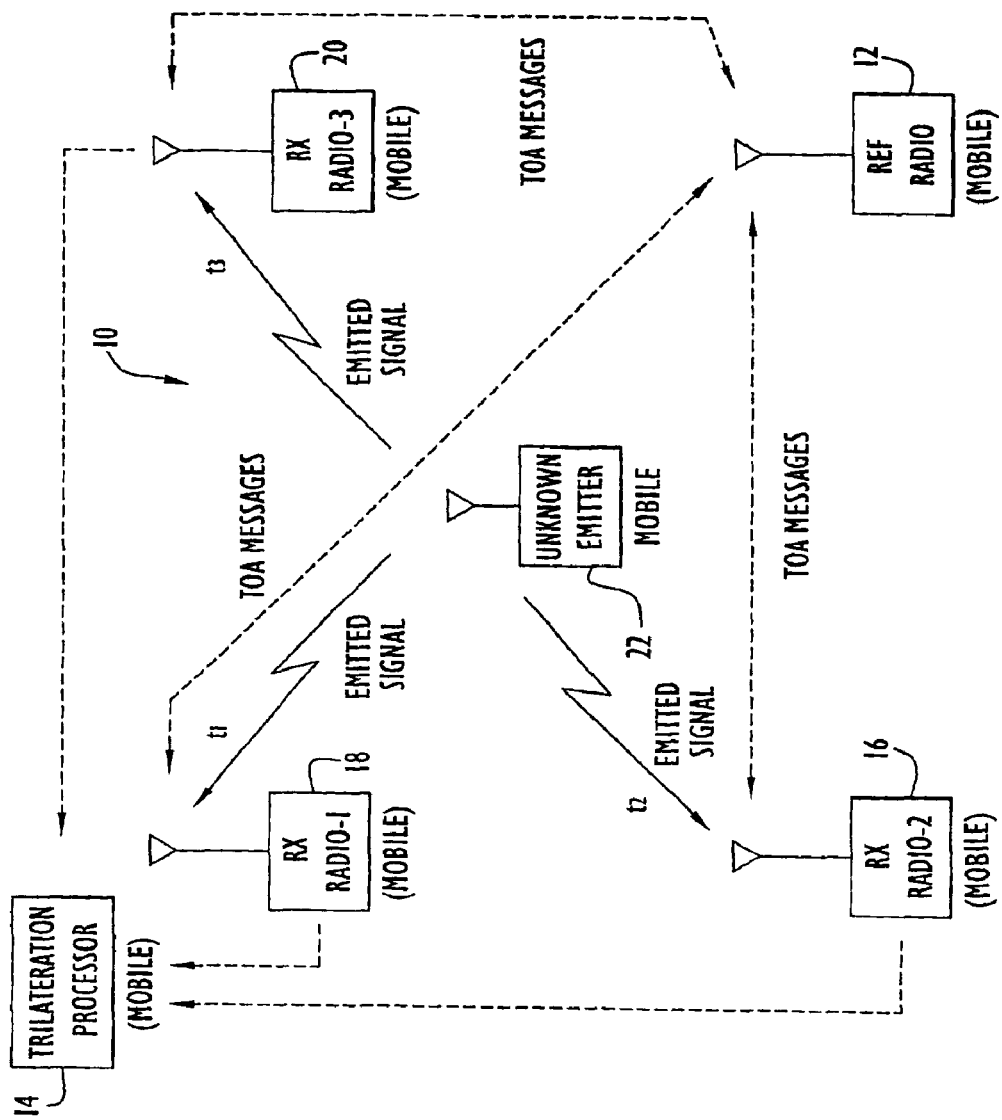
FIG. 1 is a diagrammatic functional view of a system for determining the position of an emitter in accordance with an exemplary embodiment of the present invention.
Figure 2:
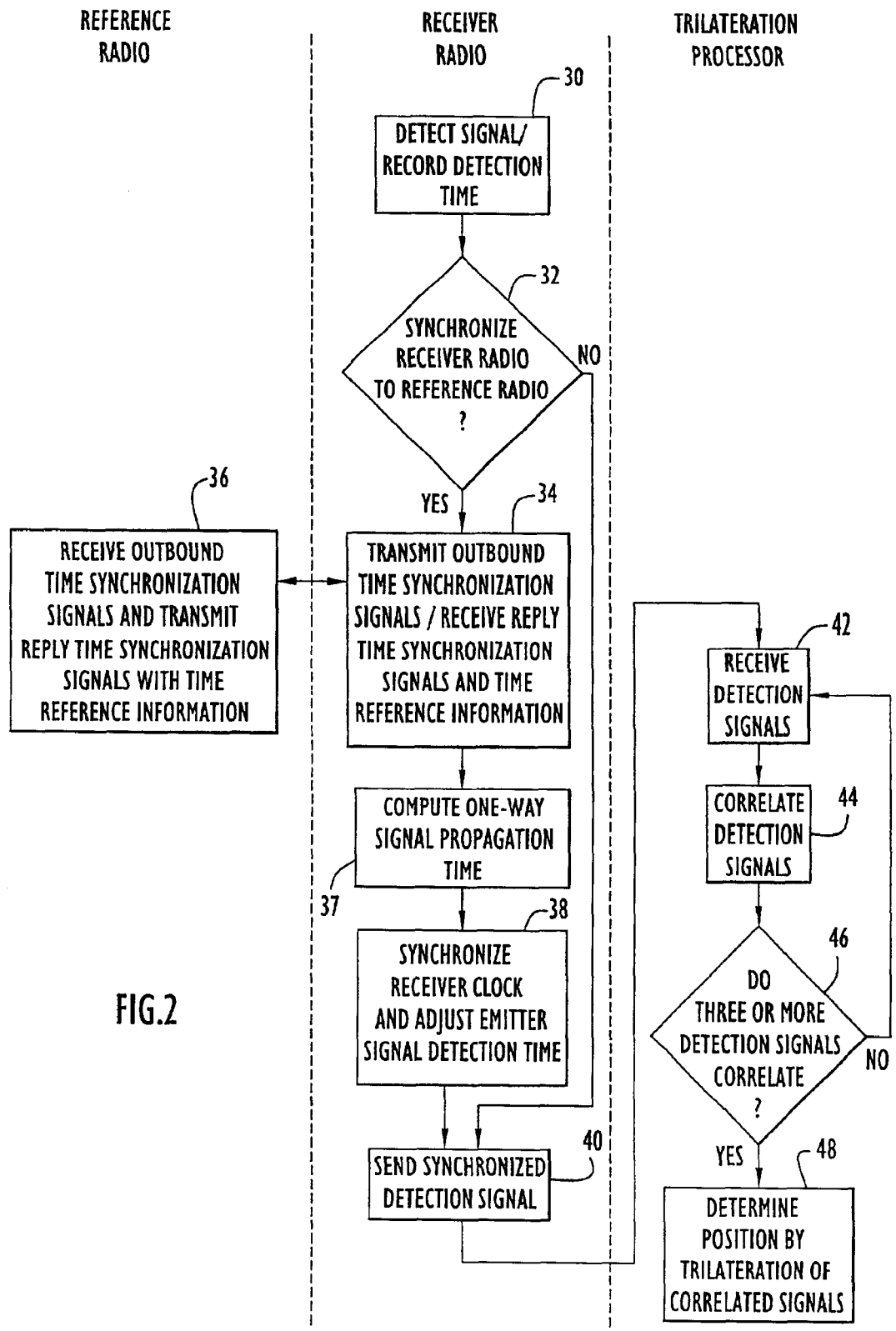
FIG. 2 is a functional process flow diagram illustrating the operations performed by each component of a system for determining the position of an emitter in accordance with an exemplary embodiment of the present invention.

An exemplary embodiment of the present invention is represented in FIG. 1 with a diagrammatic functional view and is represented in FIG. 2 with a functional process flow view. As indicate in both figures, the process of estimating the position of an emitter using the techniques disclosed in the present invention begins with the detection of an emitted signal from an unknown emitter. In FIG. 1, receiver radios 16, 18, and 20 detect an emitted signal from an unknown emitter 22. In FIG. 2, which presents a unified process flow of events, detection of an emitted signal by all three receiver radios is represented in step 30. As indicated in step 30, upon detection of an emitted signal, all receiver radios will record the time of detection ($T_{ReceiverDetection}$) based upon each receiver radio's internal clock time. In each receiver radio, the time of detection $T_{ReceiverDetection}$ is determined in the local time frame of reference established by the receiver's local clock. Due to local clock inaccuracies, the respective local time reference frame of the receiver radios vary and become different over time, such that the receiver radios do not independently maintain a common time reference frame.

To correct for difference in local time reference frames, each receiver radio synchronizes with a common reference radio 12, and adjusts the recorded time of detection $T_{ReceiverDetection}$ to a time of detection $T_{ReferenceDetection}$ that is in a common time frame of reference established by the reference radio, thereby placing all of the detections of the emitted signal in the same time reference frame. As shown in FIG. 1, each receiver radio then transmits a signal detection notification to the trilateration processor 14. Each signal detection notification contains the common time correlated value of $T_{ReferenceDetection}$ and, if the position of the receiver radio is unknown to the trialteration processor, may also contain the respective position of the notifying receiver radio at the time of detection. The trilateration processor receives and correlates signal detection notifications from multiple receiver radios based upon time of receipt and/or signal content. If three or more signal detection notifications can be correlated, trilateration processing techniques are used to calculate the position of the emitter based upon the respective detection times and the known positions of the respective receiver radios at the time of detection.

As used herein and in the claims, an "emitter" includes any device or other entity that emits an electromagnetic signal that can be detected. For example, the term emitter includes, but is not limited to, a search and rescue transmitter belonging to a party in need of rescue, a poorly shielded and/or misfunctioning electronic device that emits spurious electronic signals, a fixed position or mobile RF transmitter, a communication device operated surreptitiously by a hostile party, a radio device which intentionally or unintentionally interferes with authorized transmissions, or any wireless communication device, such as a wireless telephone or PDA. As used herein and in the claims, a non-cooperating emitter is any emitter that is not directly assisting in the determination of the emitter's position, other than to provide the emitted signal (to be distinguished from an emitter that knows its own position and freely supplies that information via a transmitted signal, or an emitter engaged in a two-way communication designed to determine or reveal the emitter's position). For example, the term non-cooperating emitter includes, but is not limited to: a beacon device emitting a signal designed to be detected and to permit searchers to home in on the device; an emitter seeking to avoid detection by third parties; and a wireless telephone or radio engaged in a two-way communication with other communication devices but nevertheless not directly supplying position information to these other communication devices.

Understandably, the characteristics of signals produced by such emitters are highly diverse. The duration of an emitted signal, for example, could vary from a very brief single burst transmission to a long continuous transmission, or could encompass a train of random or predictably spaced emissions. Signal frequency could fall within a range from low frequency to extremely high frequency, or could fluctuate based upon random or predictable frequency modulation. Signal strength, in some cases, may be so faint as to be barely perceptible above the natural background of electromagnetic noise, as in the case of a distant or spread spectrum signal, or could be strong, as in the case of a signal purposefully designed to interfere with or to jam other broadcasts. The broadcast area of an emitted signal could manifest itself as a spatially narrow or broadly focused beam, one or more elongated lobes, or a relatively evenly distributed sphere or hemisphere. Furthermore, the broadcast area could change over time, as in the case of a sweeping directional beam, and/or could be further complicated by fixed or moving physical obstructions and multi-path reflections. The present invention can successfully estimate the position of an emitter that emits any form of detectable electromagnetic signal. Nevertheless, an important aspect of the emitter position estimating system disclosed in present invention is that it is substantially operationally independent of the technology required to physically detect and correlate an emitted signal. Any signal that can be detected by three or more receiver radios, including the briefest of transmission signals, will provide the basis for determining the position of the emitter using the trilateration based position estimating techniques disclosed herein. By way of non-limiting example, detection of emitted signals can be performed by modularly replaceable units that are integrated with, and/or attached to, the receiver radio. Such modular signal detection software and/or hardware units may include state-of-the-art, commercial off the shelf (COTS) software and/or hardware, digital signal processors (DSP), field programmable gate arrays (FPGA), and application specific integrated circuits (ASICS). These modularly replaceable units allow a receiver radio to be specifically tailored and/or reprogrammed, as necessary, to meet specific operational signal detection requirements, and to modularly adapt to changes in signal transmission and/or detection techniques.

As used herein and in the claims, a "communication device" or "radio" includes any device, mobile or stationary, that is capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; any portable electronic device equipped with wireless reception/transmission capabilities, including multimedia terminals capable of receiving/transmitting audio, video and/or data information; any device mounted in a fixed location with transmission/reception capabilities; and any type of position estimating transmitter/receiver. Each of the receiver radios 16, 18 and 20, in FIG. 1, can be any device or radio located at a known position that is capable of detecting a signal from an emitter and can communicate with a common reference radio and trilateration processor device. The receiver radios can be any combination of: beacon-like radios fixedly mounted in a known position; mobile radios capable of determining their own positions from others sources, such as from reception of global positioning system (GPS) signals; and other mobile radios capable of determining their own position using two-way time synchronization technique, such as those described in the aforementioned U.S. patent applications (Ser. Nos. 09/365,702 and 09/777,625).

Trilateration techniques used in association with the present invention rely upon the knowledge that light travels at a known constant speed, $3 \times 10^8$ m/sec, and that the range between objects can be determined based upon the relationship expressed by Range=C×T, where C is the speed of light and T is the time required for light to travel between positions. Given that the speed of light is so great, even small errors with respect to the time of detection recorded by each receiver radio for each detected emitter signal will have significant impact upon the resulting calculated position. In the present invention, trilateration calculations for estimating the position of an emitter are based upon emitted signal times of detection recorded by physically different receiver radios at known positions. Therefore, a common time reference frame must be established across the respective receiver radios to avoid significant error in the calculated emitter position estimate due to clock synchronization errors.

Techniques employed in prior art to establish a common time reference frame across multiple disparate physical devices require the use of highly accurate clocks synchronized to a common time reference frame. The high accuracy of the clocks allows the separate devices to remain synchronized for extended periods of time between resynchronization. Unfortunately, such highly accurate clocks are relatively expensive and designs which require such high accuracy clocks are relatively expensive to deploy. As depicted in FIG. 1, the present invention avoids time synchronization errors, as well as the need to use expensive high accuracy clocks, by employing a two-way transmission of spread spectrum time synchronization signals between receiver radios 16, 18, and 20 and a common time reference radio 12 to establish a common synchronized time reference frame. Use of spread spectrum signals allows the time of arrival of time synchronization signals to be accurately determined, thus increasing the accuracy of common reference time correlation adjustments to receiver radio emitter signal detection times, $T_{ReceiverDetection}$, even under heavy multipath interference environments, thereby permitting the use of low accuracy clocks. As used herein, the term "low accuracy clock(s)" refers to a clock having a low accuracy relative to the accuracy of present state-of-the-art clocks used in time-synchronized systems, specifically, an accuracy in the range between approximately 0.5 ppm and 10 ppm. While low accuracy clocks will experience significant drift over time, this drifting does not impact the performance of the system of the present invention, because the system computes and accounts for differences between the local clocks of different receivers at the time signals to be correlated are detected.

Referring now to FIG. 2, step 32, and to FIG. 1, each receiver radio 16, 18, and 20, upon detection of an emitted signal, must assess whether it is necessary to resynchronize its own internal clock and to update the detection time associated with the detected signal. Again, at each receiver radio, the arrival time of the detected emitter signal is initially known in the local time reference frame of the receiver radio; unless differences between the local time reference frames are accounted for, the detection times at the different receiver radios cannot be used to accurately determine the emitter position. If the highest accuracy achievable with the receiver radio is required, the receiver radio can resynchronize with the reference radio after every signal detection. However, consideration of performance factors, other than accuracy, may result in proceeding with the position calculating process without resynchronization. For example, the known quality and drift characteristics of the internal clock and the known duration since the last synchronization may allow position accuracy requirements to be satisfied without an immediate update. Furthermore, if the network is busy passing other operational traffic, or if speed of processing is considered more important than accuracy, a balancing of accuracy versus performance factors may militate against performing an immediate time synchronization process. Use of the techniques disclosed within the present invention allow cost effective devices to be designed that provide flexibility with respect to how operational requirements are met. If higher accuracy and greater time between synchronizations are required, and/or if network congestion is expected to be high, a higher accuracy clock can be used. Otherwise, similar levels of performance may be achieved using less accurate clocks, at the expense of imposing greater network load, if the highest level of accuracy achievable with such devices is to be realized.

Thus, for example, the receiver radio may synchronize with the reference radio upon detection of an emitted signal only when an estimate accuracy of the local time reference frame (relative to the time reference frame of the reference radio) is worse than a predetermined value. As another example, the receiver radio may synchronizes with the reference radio upon detection of an emitted signal only when a predetermined period of time has elapsed since the receiver radio last synchronized with the reference radio. In accordance with another embodiment, the receiver radio can periodically synchronizes with the reference communication device or synchronizes when an estimate accuracy of the local time reference frame is worse than a predetermined value. Optionally, all of these synchronization schemes can be implemented as a function of network loading, where the frequency with which synchronizations are performed is adjustable.

As depicted in FIG. 2 at steps 32, 34, and 36, if, based upon the considerations presented above, a receiver radio determines that it is necessary to synchronize its clock with the reference radio, the receiver radio will initiate a two-way or round-trip time synchronization scheme based upon the exchange of a series of time synchronization signals with the reference radio. In FIG. 1, this exchange of a series of time synchronization signals is represented with bi-directional arrows between each receiver radio 16, 18 and 20 and the reference radio.

By precisely knowing the time of transmission of the outbound time synchronization signal, the far-end turn around time at the reference radio, and the time of arrival of the reply time synchronization signal, the receiver radio can precisely determine the signal propagation time between itself and the reference radio (step 37). The one way signal propagation time ($T_{1-way}$) can be described as one half of the difference between a) the round trip elapsed time ($T_{RT}$) between the time of transmission of the outbound time synchronization signal by the receiver radio and the time of arrival of the reply time synchronization signal at the receiver radio and b) the turn around elapsed time ($T_{TA}$) between the time of arrival of the outbound time synchronization signal at the reference radio and the time of transmission of the reply time synchronization signal by the reference radio, or:

$$T_{1-WAY}=0.5(T_{RT}-T_{TA}) \qquad (1)$$

Once the one-way signal propagation time is computed, in step 37, the original time of detection by the receiver radio ($T_{ReceiverDetection}$) is adjusted, in step 38, to reflect the common time frame of the reference radio ($T_{ReferenceDetection}$) by adding to the receiver-based detection time, $T_{ReceiverDetection}$, a time frame adjustment $\Delta T$ computed as the time of arrival of the outbound time synchronization signal at the reference radio ($T_{ReferenceTOA}$), less the one-way signal propagation time, $T_{1-way}$, less the time of transmission of the outbound time synchronization signal by the receiver radio ($T_{ReceiverTransmit}$), or:

$$T_{ReferenceDetection}=T_{ReceiverDetection}+(T_{ReferenceTOA}-T_{1-Way}-T_{ReceiverTransmit}) \qquad (2)$$

Adjusting each respective receiver radio's $T_{ReceiverDetection}$ by $\Delta T$ in accordance with the above calculation, based upon $T_{ReferenceTOA}$ values obtained from a common reference radio, allows each physically separate and distinct receiver radio to correlate its respective $T_{ReceiverDetection}$ to a common time reference frame established by the reference radio. The calculated value of $\Delta T$ may be either positive or negative, depending upon the lag/lead time between the receiver radio and reference radio clocks and depending upon the duration of the one-way propagation time between devices, thereby resulting in a positive or negative value adjustment to the original receiver radio time of detection.

As used herein and in the claims, "accounting for" the timing difference or offset between the local time reference frame of a receiver radio and the reference radio can involve either adjusting the detection time of the emitted signal by the determined timing difference or adjusting the local time reference frame to be the same as that of the reference radio, or both, such that the detection time of the emitted signal is in the common time reference frame established by the reference radio. For example, when the timing difference between the receiver and reference radios is determined upon detecting an emitted signal at the receiver radio, accounting for the timing difference involves adjusting the detection time itself, since the local time reference frame in which the detection time was initially determined would not have accounted for any timing difference at the time of detection (optionally, the timing difference can also be used at this time to adjust the local time reference frame to be the same as the time reference frame of the reference radio). However, where the timing difference between the local time reference frame and the time reference frame of the reference radio is not determined upon detection of the emitted signal (e.g., where the timing difference is determined periodically or less than every detection), the "accounting for" the timing difference can be accomplished by having adjusted the local time reference frame to be the same as the time reference frame of the reference radio at the time of the last determination of the timing difference between the local and reference time frames.

Likewise, as used herein and in the claims, "synchronize", "synchronizing", "synchronization", etc., of the local time reference frame of the receiver radio with the time reference frame of the reference radio refers to accounting for the timing difference between the local and reference time frames by adjusting the local time reference frame, the detection time itself, or both, such that the detection time of the emitted signal is ultimately known in the common time reference frame established among the receiver radios by the reference radio. For convenience, accounting for the timing difference may be handled at the receiver radio itself. Alternatively, the receiver radio can supply the timing difference information to the trilateration processor along with the detection time of the emitted signal, and the trilateration processor can adjust the detection time in accordance with the timing difference.

As indicated above, both the receiver and reference radios of the exemplary embodiment of the present invention must be able to accurately determine the time of arrival of the respective time synchronization signals. To achieve this accuracy, a number of techniques can be used by receiver and reference radios to increase their ability to accurately determine the true time of arrival of incoming time synchronization signals, such as those described in the aforementioned U.S. patent applications (Ser. Nos. 09/365,702 and 09/777,625), incorporated herein by reference in their entirety.

To minimize processing delay timing errors resulting from asynchronous events that occur within the signal processors of the radios, delay calibration may be performed to accurately estimate the actual internal processor time delays that occur in association with processing a time synchronization signal and transmitting a reply time synchronization signal. The total elapsed time measured by the receiver radio between transmission of the outbound time synchronization signal and reception the reply time synchronization signal includes time attributable to propagation of the signals and time attributable to processing delays within both the receiver and reference radios. By accurately estimating and subtracting out the time attributable to processing delays, the signal propagation time can be more accurately determined.

Figure 3:
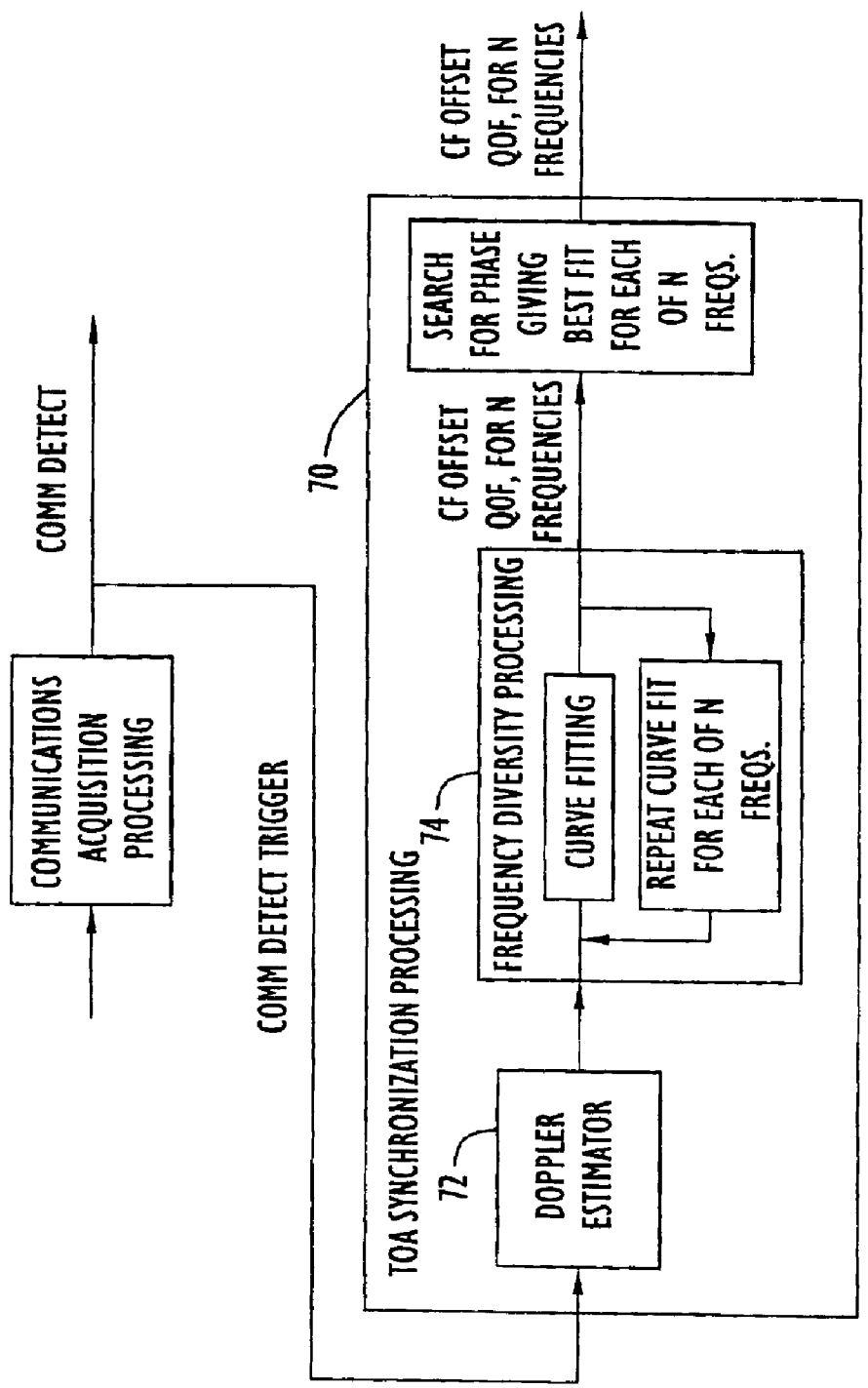
FIG. 3 is a functional block diagram illustrating the processing performed by receiver and reference devices of the exemplary embodiment of the present invention to determine the time of arrival of a time synchronization signal, including doppler estimation and evaluation and separation of multipath interference from the direct path signal.
Figure 4:
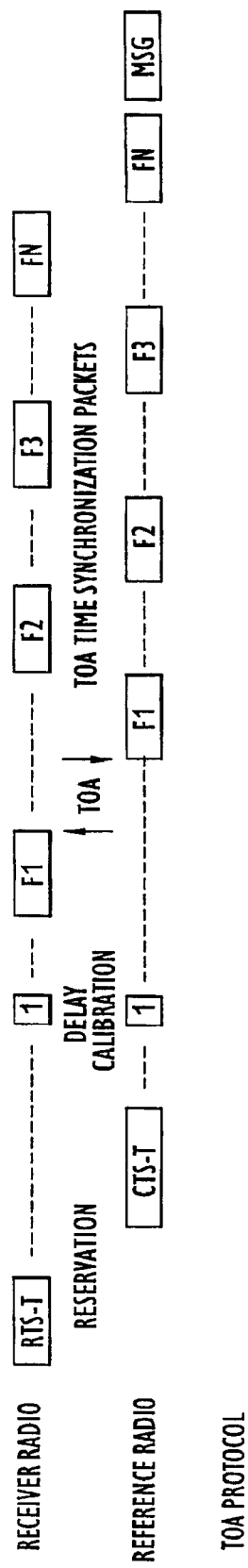
FIG. 4 illustrates a time synchronization signal exchange sequence performed by the receiver device and a reference device during a time synchronization session in accordance with the exemplary embodiment of the present invention.

FIG. 3 presents an overview of time synchronization signal processing techniques that may be used by both reference and receiver radios on an incoming time synchronization signal to determine the signal's exact time of arrival (TOA). As shown in FIG. 3, both the receiver and reference radios identify the time synchronization signal by performing communication acquisition processing 60 on the incoming time synchronization signal. In stationary, multipath free environments, the TOA could be based upon the time of acquisition of the time synchronization signal. However, in environments where either of the receiver or reference radios are moving rapidly or the possibility of multipath signal interference exists, additional TOA synchronization processing 70 of the time synchronization signal may be performed.

In the case of rapidly moving receiver radio and/or reference radio devices, Doppler shift estimation processing 72 of each arriving time synchronization signal can be performed and the Doppler shift compensated for in determining the signal's time of arrival. In multipath environments, frequency diversity processing 74 may be used. Frequency diversity processing is a technique based upon the knowledge that diverse frequencies create diverse carrier phases in multipath and that time synchronization performance is best when the carrier phase of the multipath is 90° with respect to the direct path. Using frequency diversity, a sequence of time synchronization signal pairs are exchanged in rapid succession between the receiver radio and the reference radio, with each signal pair transmitted at a different carrier frequency. Leading edge curve fitting is used to accurately locate the leading-edge of the TOA synchronization signal. A curve fitting timing offset (CF offset) relative to the nearest sample time, along with a quality of fit (QOF) metric that estimates the accuracy of the CF offset, is determined for each frequency transmitted. In this manner, N sets of time synchronization signals are transmitted at N different carrier frequencies. After all N sets of time synchronization signals have been exchanged, the reference radio precisely determines the time of arrival of the time synchronization signals and sends a final message packet (MSG) to the receiver radio.

The MSG packet transmitted from the reference radio to the receiver radio contains the following data: reference radio clock time at the time of arrival of each outbound time synchronization signal; reference radio delay calibration ($T_{DC\_Reference}$); curve fit offset due to curve fitting the time synchronization packet data at the reference radio ($\Delta T_{Reference\ CF\ offset}$); the best carrier frequency found by the reference radio (the carrier frequency at which the multipath error is most orthogonal); an estimate of the accuracy of the TOA estimate from curve fitting (quality of fit (QOF)); the reference radio position and position accuracy (e.g., latitude, longitude, altitude, and spherical position standard deviation); the reference radio velocity and velocity accuracy (e.g., east, north, up and spherical velocity standard deviation); noise information; power and data rate control information; and error correction code information.

Using these techniques, the one way signal propagation time or one way time of arrival ($T_{TOA}$) is more precisely determined by:

$$T_{1\text{-}WAY} = 0.5(T_{RT} - T_{DC\ Receiver} - T_{DC\ Reference} - T_{TA} + \Delta T_{Receiver\ CF\ offset} + \Delta T_{Reference\ CF\ offset}) \quad (3)$$

where $T_{RT}$ is the total round trip elapsed time from transmission of an outbound time synchronization signal to reception of a corresponding reply time synchronization signal, $T_{DC\ Receiver}$ is the internal delay in the receiver radio (determined from delay calibration), $T_{DC\ Reference}$ is the internal delay in the reference radio, $T_{TA}$ is the reference radio turnaround time, $\Delta T_{Receiver\ CF\ offset}$ is a time offset due to curve fitting the time synchronization packet data at the receiver radio, and $\Delta T_{Reference\ CF\ offset}$ is a time offset due to curve fitting the time synchronization packet data at the reference radio.

Note that turn around time ($T_{TA}$) is an absolute time duration, unrelated to a particular timing reference of any local clock. That is, the turn around time (which can be a fixed period of time) is determined by the reference radio as the difference between the time of transmission of the reply time synchronization signal transmitted by the reference radio and the time of arrival of the outbound time synchronization signal at the reference radio. While the time of arrival and time of transmission at the reference radio are determined in the time reference frame of the reference radio's local clock, the resulting time difference ($T_{TA}$) is independent of the reference time frame of the reference radio. In fact, as previously mentioned, the turn around time can be made constant by transmitting the reply time synchronization signal a fixed period of time after arrival of the outbound time synchronization signal. Thus, the round trip propagation time can be determined by the receiver radio in its own timing reference kept by its local clock without reference to or synchronization with the timing reference of any of the clocks of the reference radios (i.e., system synchronization is not required). In effect, the receiver radio "starts a timer" when the outbound time synchronization signal is transmitted, "stops the timer" when the reply time synchronization signal arrives, and then subtracts the turn around time and internal processing delays from the "timer's elapsed time" to obtain the duration of the round-trip signal propagation.

Referring again to FIG. 2, in steps 37 and 38 the receiver radio uses the CF offset, QOF and delay calibration from the reference radio at the frequency determined by the receiver radio to provide the best QOF, along with the total round trip time ($T_{RT}$), the CF offset of the receiver radio, and the receiver radio delay calibration to compute the final TOA, synchronize the receiver radio clock, and update the detection time associated with the most recently detected signal (s).

By way of non-limiting example, the Carrier Sense Multiple Access with Collision Avoidance (CSMA/CA) protocol can be adapted for use as a messaging protocol to transmit time synchronization signals between receiver radios and the reference radio. As depicted in FIG. 5, if an adapted CSMA/CA protocol is used, the receiver radio initiates the time of arrival (TOA) time synchronization session by transmitting a channel reservation request signal RTS-T requesting access to a communication channel for a period of time required to exchange a sequence of time synchronization signals with the reference radio. Upon receiving the RTS-T signal, if the requested channel is available, the reference radio transmits a reply reservation signal CTS-T back to the receiver radio indicating that the channel is available and the reference radio is ready to exchange time synchronization signals with the receiver radio, thereby completing the reservation for time synchronization.

Once the receiver radio and reference radio have exchanged the RTS-T and CTS-T signals and, if necessary, performed delay calibration, the receiver radio and reference radio exchange time synchronization signals at a single frequency F1. In the case where frequency diversity is used, the receiver radio continues to transmit a series of time synchronization signals or TOA pings at different frequencies F2-FN until time synchronization signals have been exchanged for each of N frequencies. In this manner, the N sets of time synchronization signals are transmitted at N different carrier frequencies. After all N sets of time synchronization signals have been exchanged, the reference radio precisely determines the time of arrival of the time synchronization signals and sends a final signal packet (MSG) to the receiver radio.

The MSG packet 100 transmitted from the reference radio to the receiver radio contains the data required to correlate the emitted signal time of detection to the common reference time maintained by the reference radio and to synchronize the receiver radio clock to that of the reference radio. Of course, it will be understood that the messaging scheme employed by the present invention is not limited to any particular protocol, and any suitable message or signal structure that permits measurement of one-way signal propagation time, $T_{1\text{-}WAY}$, can be used.

As will be evident from the foregoing, each receiver radio, as well as the reference radio, is equipped with a transmitter and a receiver for exchanging the time synchronization signals. Depending on the nature of the signal from the emitter, at least some portion of the time synchronization signal receiver hardware and/or software may also be useful in detecting the emitter signal. Where components of the time synchronization signal receiver are not useful in detecting the emitter signal, a separate emitted signal receiver can be used detect the emitted signal. As used herein and in the claims a "receiver device" includes the receiver hardware/software for receiving both the signal from the emitter and the time synchronization signals transmitted by the reference communication device, irrespective of the particular receiver configuration. Thus, for example, the receiver device can include an integrated electronics package capable of receiving both the emitted signal and the time synchronization signals, or the receiver device can include two completely separate receivers, one for detecting the emitted signal and another for detecting the time synchronization signals.

As indicated in FIG. 1 by dashed arrows leading from receiver radios 16, 18, and 20 to trilateration processor 14, once the receiver signal detection times and/or internal clocks have been synchronized to the common time reference frame, the receiver radios notify the trilateration processor with a signal detection notification containing the synchronized time of detection and information about the detected signal (step 40 in FIG. 2). The trilateration processor receives and correlates signal detection notifications from multiple receiver radios based upon time of receipt and/or signal content (FIG. 2, steps 42 and 44). If three or more signal detection notifications can be correlated, trilateration processing techniques are used to calculate the position of the emitter, based upon the respective synchronized detection times and the positions of the respective receiver radios at the time of detection (FIG. 2, steps 46 and 48).

Correlation is the process by which the trilateration processor is able to identify multiple emitter signal detection notifications, received from multiple physically separated receiver radios, as having resulted from the detection of the same single emitter transmission. There are many ways by which a trilateration processor can determine that separate signal detection notifications are associated with the same emitter signal transmission event. One technique is to compare, using digital signal processing techniques, raw signal information captured by the respective receiver radios and included within the respective detection notification signals. Another is to compare signal signatures comprised of select signal characteristic information collected by the respective receiver radios and placed within the respective detection notifications. Still another technique involves reducing the number of potentially related detection notifications based upon an analysis of the known positions of the respective receiver radios from which the detection notifications were received and the times at which the detection notification were detected by each, based upon an emitter broadcast area of interest. Using such a technique a set of maximum time of detection differences can be calculated so that only signal detection notifications resulting from signals originating from within a predetermined broadcast area are selected for signal characteristics comparison. Yet other techniques can involve a combination of several techniques, such as those described, above. Naturally, it is important that detection notifications are accurately correlated; however, the present invention is not limited to any particular technique by which the trilateration processor achieves signal correlation.

The trilateration processor uses known relationships to calculate the location of the signal emitter based upon the positions of the respective receiver radios and the synchronized time of detection values obtained from the correlated signal detection notifications. Using such techniques, in order to solve for N unknown values, N independent equations must first be defined. In addition to the spatial dimensions (x, y, and z), the original time of transmission of the detected emitter signal is unknown. The definition of each independent equation requires a unique set of receiver radio position coordinates combined with a synchronized time of detection value, as received by the trilateration processor in a correlated signal detection notification. Therefore, to determine the position of the signal emitter in two dimensions (e.g., x and y), the trilateration processor must first correlate three signal detection notifications and form three independent equations. A fourth correlated signal detection notification (using a fourth receiver radio) is required to determine the position of the signal emitter in three dimensions (i.e., x, y, and z). If detections from more than four receivers are correlated to a single emission, the system is over resolved, and an even more accurate determination of the emitter's position may be possible.

The present invention minimizes design and production costs associated with an emitter position estimating system by using commercially available hardware and software such as inexpensive, low accuracy clocks, spread spectrum communication hardware and proven and efficient network architecture and protocols. One exemplary embodiment of the present invention, previously introduced, employs a variation of the CSMA/CA protocol to perform TOA time synchronization between receiver and reference radios. Similarly, the components of the present invention (i.e., receiver, reference, and trilateration processors, etc.) may avail themselves of an underlying commercially available network to facilitate communication between devices. Such an underlying network may support inter-device communication required to dynamically maintain information that facilitates optimal selection of reference radio(s) and trilateration processor(s) for clusters of receiver radios.

So that the ability to locate an emitter is established for as broad a geographic area as possible, an individual receiver radio may be assigned multiple reference radios with which to synchronize and multiple trilateration processors to which it may report detections. To accommodate receiver radio, reference radio, and trilateration processor movement, network connectivity information may be dynamically maintained by the network, independent of the present invention, based upon considerations which may include: the strength of the signals exchanged, physical device proximity to and connectivity with other devices, degree of confidence associated with the receiver radio's reported position, etc.

The network can maintain connectivity between widely dispersed clusters of radios using a wide variety of network hierarchies. Connectivity and position estimation system related information may be centrally stored upon devices serving as communication hubs, and/or all or a portion of the collected information may be stored locally upon the respective receiver radio, reference radio, and trilateration processor devices. Network communication hierarchy routing tables and direct node to node connectivity information can be updated via a series of periodic beacon signals from the respective devices, and/or network defined registration processes. In this manner the network configuration and associated receiver radio, reference radio and trilateration processor device assignments can dynamically reconfigure as the respective devices move relative to one another.

As part of the dynamic network maintenance process introduced above, the essential connectivity information required to optimally select reference radios and trilateration processors for clusters of receiver radios with overlapping broadcast areas is ascertained and can be distributed to the respective receiver radios where it can be stored for use, as needed. To provide complete coverage of a geographical area, the network may chose to assign a cluster of receiver radios to a different reference radio, or to assign one or more individual receiver radios to multiple reference radios and/or multiple trilateration processors. Such assignment information can be disseminated as part of defined beacon updates and network registration processes, addressed above.

The network may further support the present invention by facilitating the dynamic maintenance of receiver radio physical position estimates. Trilateration processing to determine the position of an emitter requires that the positions of the respective receiver radios be known to a high level of accuracy. The manner by which receiver radio's determine their physical position is independent of the present invention. Receiver radios may determine their position using TOA range based calculations, as described in the aforementioned U.S. patent applications (Ser. Nos. 09/365,702 and 09/777,625), or by other means, such as GPS, or manual entry (in the case of fixed stationary devices). If a receiver radio is stationary, its position need be determined only once and stored in the receiver radio's memory. Furthermore, trilateration processors can store receiver radio position information in the processor's memory, allowing position information for fixed position receiver radios to be dropped from subsequent detection notifications to the trilateration processor. If a receiver radio is mobile, however, the device must repeatedly update its position so as to not degrade the accuracy of emitter position estimates. Intervals between position updates of a receiver radio may be increased depending upon its past history of position changes and the accuracy required by the emitter position estimating system. If a trilateration processor receives multiple signal detection notifications, it may exclude detection notifications from receiver radios for which position information is considered less accurate than position information associated with other receiver radios reporting the same correlated detection. Furthermore, trilateration processors can store receiver radio position information in the processor's memory and, through comparison, determine which receiver radios are fixed and/or move slowly and/or in a relatively predictable manner, so as to assist the trilateration processor in selecting the most reliable receiver radios for use in subsequent trilateration based position calculations.

To assure that detection notifications transmitted to one or more trilateration processors contain signal detection times correlated to a common time reference frame, receiver radios may need to synchronize emitter signal detection times with one or more reference radios and broadcast emitter signal detection notifications containing several synchronized time of detection values, each correlated to a different reference radio. Any device capable of supporting time synchronization communication with three or more receiver radios (which may include itself may serve as a time reference radio. Reference radio capabilities can be integrated with that of a receiver radio as well as with that of a trilateration processor. Selection of a reference radio may be static, as in an operational environment in which the position of receiver radios and reference radios are fixed, or dynamic, as required by operational environments in which receiver radios and/or other potential reference radios are mobile. Dynamic selection/reselection of an appropriate reference radio for a cluster of receiver radios will be supported by the underlying network, as previously discussed based upon considerations, which may include: the reference radio's proximity to and connectivity with other devices, the accuracy of the reference radio's clock, the strength of time synchronization signals and/or degree of signal distortion of time synchronization signals transmitted between the respective receiver radios and the reference radio, etc.

Upon detection of a signal and synchronization of the time of detection with one or more designated reference radios, receiver radios may transmit a emitter signal detection notification to one or more trilateration processors. In this manner the likelihood is increased that a single trilateration processor will receive a sufficient number of signal notifications to successfully calculate the position of the emitter. Any device with sufficient processing capability may serve as a trilateration processor. Trilateration processor capabilities can be integrated with that of a receiver radio as well as with that of a reference radio. A trilateration processor does not need to be within direct radio broadcast range of the respective receiver radios from which is receives signal detection notifications. So long as detection notifications can be received directly and/or routed via the radio links or land-line links associated with the network, trilateration processing can be performed. Furthermore, trilateration processors which are unable to correlate three or more signal detections may pass the uncorrelated signal detection notifications to neighboring trilateration processors in order to increase the likelihood of obtaining three correlated signals with which to estimate the position of the emitting device. Selection of trilateration processors may be static or dynamic. Given that the trilateration processor does not need to be physically proximate to the respective receiver radios from which it receives information, selection of a trilateration processor is primarily based upon network load considerations associated with delivering signal detection notifications to the trilateration processor and/or trilateration processor calculation capacity. If a given trilateration processor becomes associated with a network traffic bottleneck or a calculation capacity bottleneck, a portion of the receiver radios may be redirected to send their signal detection notifications to another trilateration processor. Such redirection of signal detection notifications will be handled through defined beacon updates and network registration processes, independent of the present invention.

The above-described signal emitter position estimation system determines the position of both fixed and mobile emitters in real time with high accuracy. The need for antenna arrays and directed antennas is eliminated through the deployment of multiple physically compact and highly mobile receiver radios to different geographical positions. Design and production costs are minimized through the use of commercially available hardware and software such as inexpensive, low accuracy clocks, spread spectrum communication hardware and proven and efficient network architecture and protocols. The disclosed invention can be transparently integrated within compact, handheld or portable, multi-purpose communication devices, thereby allowing widespread deployment at minimal incremental cost. Detection and position estimation of emitters can be supported, either actively or passively, without disrupting simultaneous voice and/or data communication services supported by the device. The physical position of an emitter can be detected under severe multipath conditions, such as urban areas and inside buildings, by minimizing the effects of interference caused by multipath signal propagation. The position of an emitter can be detected based upon a single brief transmission, with no prolonged tracking of the emitted signal. The disclosed trilateration based position estimating capability is operationally independent of the signal detection requirements and signal detection technology used to physically detect emitted signals. In addition, the disclosed invention is compatible with and can be integrated within a resource tracking system for locating and tracking deployed emitters.

In accordance with the disclosed emitter position estimating system, emitter signals detected by physically separate and distinct receiver radios can be accurately adjusted to a common time reference frame, thereby allowing the position of an emitter to be established using trilateration techniques. Using two-way transmission of spread spectrum time synchronization signals between receiver radios and a common time reference radio, a common synchronized time reference frame is established across all receiver radios involved in the detection of a signal. This time synchronization process allows the position of an emitter to be determined with a high degree of accuracy using devices which employ cost effective and relatively low accuracy clocks.

Upon detection of a signal, each receiver radio performs a time synchronization process with a pre-designated or commonly negotiated reference radio and then synchronizes the time of signal detection to a common time reference frame established by the reference radio. Having time synchronized the detected signal, the receiver radio transmits a signal detection notification to a trilateration processor. The trilateration processor receives and correlates signal detection notifications from multiple receiver radios based upon time of receipt and/or signal content. If three or more signal detection notifications can be correlated, trilateration processing techniques are used to calculate the position of the emitter based upon the respective synchronized detection times and the positions of the respective receiver radios at the time of detection. Receiver radio, reference radio, and trilateration processor capabilities can be performed by separate physical devices, or within a single device.

The highly accurate emitter position estimating system disclosed herein is capable of locating both fixed and mobile emitters, in real time, regardless of the nature of the signal emitted. The need for high accuracy clocks is eliminated through the use of a very precise time synchronization process that allows a common time reference frame to be established across receiver radios. Receiver radios are synchronized using a two-way time of arrival (TOA) processing scheme that employs techniques for determining the precise one-way propagation time between a receiver radio and the time reference radio, thereby allowing a receiver radio to be precisely time synchronized with the reference radio.

The emitter position estimation technique of the present invention is useful in locating any object that emits a detectable electromagnetic signal. Any signal that can be detected by three or more receiver radios and correlated, including the briefest of transmission signals, provides the basis for determining the position of the emitter. This powerful capability allows emitters to be located without extensive tracking. The technique has a wide variety of applications in support of both commercial and military operations that require the position estimation of the source of an electromagnetic transmission, such as locating distress beacons and other transmissions in support of search and rescue operations; locating the source of intentional or unintentional transmissions causing interference with authorized transmissions; locating/tracking hostile equipment and personnel based upon associated electronic emissions; and tracking emitters deployed as part of a resource tracking system.

A tracking system based upon the present invention can be used to track the position of personnel and resources located both indoors and outdoors, including but not limited to: police engaged in tactical operations; firefighters located near or within a burning building or forest fire; medical personnel and equipment in a medical facility or en route to an emergency scene, including doctors, nurses, paramedics and ambulances; and personnel involved in search and rescue operations. An accurate, efficient emitter position estimating system based upon the present invention can enhance capabilities to track and locate high-value items, including such items as personal computers, laptop computers, portable electronic devices, luggage, briefcases, valuable inventory, and automobiles. In urban environments, where conventional position estimating systems have more difficulty operating, fleets of commercial or industrial vehicles, including trucks, buses and rental vehicles can be more reliably tracked. Tracking of people carrying an emitter is also possible in a number of contexts, including, but not limited to: children in a crowded environment such as a mall, amusement park or tourist attraction; location of personnel within a building; and location of prisoners in a detention facility. The capability to accurately and efficiently determine the position of an emitter also has application in locating the position of cellular telephones. The capability to determine the position of cellular telephones can be used to pinpoint the position from which an emergency call has been made. Such information can be used to assist in cell network management (for example, by factoring each mobile communication device's position into message routing algorithms).

Having described preferred embodiments of a new and improved emitter position estimating system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of determining the position or an emitter, comprising:
   (a) detecting an emitted signal from the emitter at plural receiver communication devices positioned at different locations, the receiver communication devices determining respective detection times of the emitted signal in respective local time reference frames, wherein at least one of the receiver communication devices is a mobile communication device;
   (b) determining respective timing differences between the respective local time reference frames of the receiver communication devices and a time reference frame of a reference communication device based on a round-trip signal propagation time determined from exchanging time synchronization signals between the receiver communication devices and the reference communication device;
   (c) accounting for the respective timing differences between the respective local time reference frames and the time reference frame of the reference communication device such that the respective detection times are determined in a common time reference frame; and
   (d) determining a position of the emitter from known positions of the receiver communication devices and the respective detection times of the emitted signal.

2. The method of claim 1, wherein the receiver communication devices operate onboard a moving vehicle.

3. The method of claim 1, wherein (b) includes transmitting an outbound time synchronization signal from each of the receiver communication devices to the reference communication device and transmitting a reply time synchronization signal from the reference communication device to each of the receiver communication devices.

4. The method of claim 3, wherein the reply time synchronization signal indicates a time of arrival of the outbound time synchronization signal at the reference communication device in the common time reference frame.

5. The method of claim 1, wherein (b) includes determining a signal propagation time between each of the receiver communication devices and the reference communication device from a round-trip signal propagation time of the outbound time synchronization signal and the reply time synchronization signal.

6. The method of claim 5, wherein (b) includes determining each of the respective timing differences from a time of transmission of the outbound time synchronization signal, a time of arrival of the outbound time synchronization signal at the reference communication device, and the signal propagation time.

7. The method of claim 1, wherein (b) includes exchanging time synchronization signals between the receiver communication devices and the reference communication device using a Carrier Sense Multiple Access with Collision Avoidance (CSMA/CA) protocol.

8. The method of claim 1, wherein (b) includes exchanging time synchronization signals between the receiver communication devices and the reference communication device using spread spectrum waveforms.

9. The method of claim 1, wherein (c) includes adjusting the respective detection times by the respective timing differences between the respective local time reference frames and the time reference frame of the reference communication device.

10. The method of claim 1, wherein (c) includes adjusting the respective local time reference frames by the respective timing differences to synchronize the respective local time reference frames with the common time reference frame.

11. The method of claim 1, wherein (c) includes accounting for the respective timing differences between the respective local time reference frames and the time reference frame of the reference communication device upon detection of an emitted signal by respective receiver communication devices.

12. The method of claim 11, wherein (c) includes synchronizing the respective detection times with the common time reference frame each time an emitted signal is detected by respective receiver communication devices.

13. The method of claim 11, wherein (c) includes accounting for the respective timing differences when a predetermined period of time has elapsed since respective receiver communication devices last accounted for the respective timing differences.

14. The method of claim 1, wherein (c) includes accounting for the respective timing differences when an estimated accuracy of the respective local time reference frames is worse than a predetermined value.

15. The method of claim 1, wherein (c) includes periodically synchronizing the receiver communication devices with the reference communication device.

16. The method of claim 1, wherein the frequency with which the receiver communication devices account for the respective timing differences is a function of a level of activity in a communication network used to exchange signals between the receiver communication devices and the reference communication device.

17. The method of claim 1, wherein the receiver communication devices maintain the respective local time reference frames using low accuracy clocks.

18. The method of claim 1, wherein (a) includes detecting the emitted signal with at least three receiver communication devices.

19. The method of claim 1, wherein (d) includes:
sending signal detection information, including the respective detection times, from the receiver communication devices to a processor;
correlating the signal detection information from at least three of the receiver communication devices to a common emitted signal; and
determining the position of the emitter from known positions of the at least three receiver communication devices and the respective detection times of the common emitted signal using trilateration.

20. The method of claim 19, wherein the processor is coupled to one of the receiver communication devices.

21. The method of claim 19, wherein the processor is coupled to the reference communication device.

22. The method of claim 1, wherein the reference communication device is one of the receiver communication devices.

23. The method of claim 1, wherein all of the receiver communication devices are mobile.

24. The method of claim 1, wherein the reference communication device is mobile.

25. The method of claim 1, wherein the receiver communication devices are handheld radios.

26. The method of claim 1, wherein the receiver communication devices are wireless telephones.

27. A mobile communication device for determining a detection time of an emitted signal from an emitter, comprising:

a receiver device configured to detect the emitted signal, the detection time of the emitted signal being determined in a local time reference frame;
a transmitter configured to transmit an outbound time synchronization signal to a reference communication device, said receiver device being configured to receive a reply time synchronization signal from the reference communication device, the reply time synchronization signal indicating a time of arrival of the outbound time synchronization signal at the reference communication device in a time reference frame of the reference communication device; and
a processor configured to: determine a timing difference between the local time reference frame and the time reference frame of the reference communication device based on a round-trip signal propagation time determined from exchanging the outbound and reply time synchronization signals between the mobile communication device and the reference communication device; and account for the timing difference such that the detection time of the emitted signal is determined in the time reference frame of the reference communication device.

28. The communication device of claim 27, wherein said receiver device comprises a first receiver for detecting the emitted signal from the emitter and a second receiver for receiving the reply time synchronization signal from the reference communication device.

29. The communication device of claim 27, wherein said communication device is a wireless telephone.

30. The communication device of claim 27, wherein said communication device operates onboard a moving vehicle.

31. The communication device of claim 27, wherein said processor determines the timing difference from a time of transmission of the outbound time synchronization signal, the time of arrival of the outbound time synchronization signal at the reference communication device, and the signal propagation time.

32. The communication device of claim 27, wherein said communication device exchanges time synchronization signals with the reference communication device using a Carrier Sense Multiple Access with Collision Avoidance (CSMA/CA) protocol.

33. The communication device of claim 27, wherein said communication device exchanges time synchronization signals with the reference communication device using spread spectrum waveforms.

34. The communication device of claim 27, wherein said processor adjusts the detection time of the emitted signal by the timing difference between the local time reference frame and the time reference frame of the reference communication device.

35. The communication device of claim 27, wherein said processor adjusts the local time reference frame by the timing difference to synchronize the local time reference frame with the time reference frame of the reference communication device.

36. The communication device of claim 27, wherein said processor accounts for the timing difference between the local time reference frame and the time reference frame of the reference communication device upon detection of the emitted signal.

37. The communication device of claim 36, wherein, each time an emitted signal is detected by said communication device, said processor synchronizes the detection time of the emitted signal with the time reference frame of the reference communication device.

38. The communication device of claim 27, wherein said processor accounts for the timing difference when a predetermined period of time has elapsed since the communication device last accounted for the timing difference.

39. The communication device of claim 27, wherein said processor accounts for the timing difference when an estimated accuracy of the local time reference frame is worse than a predetermined value.

40. The communication device of claim 27, wherein said communication device periodically synchronizes the local time reference frame with the time reference frame of the reference communication device.

41. The communication device of claim 27, wherein the frequency with which said communication device accounts for the timing difference is a function of a level of activity in a communication network used to exchange signals between said communication device and the reference communication device.

42. The communication device of claim 27, wherein said communication device further comprises a low accuracy clock that maintains the local time reference frame.

43. The communication device of claim 27, wherein said transmitter transmits emitter signal detection information, including the detection time of the emitted signal, to a position-determining processor configured to determine the position of the emitter.

44. The communication device of claim 27, wherein said communication device is a handheld radio.

45. The communication device of claim 27, wherein said communication device is configured to be carried on a human body.

46. A mobile communication device for determining a detection time of an emitted signal from an emitter, comprising:
   first receiver means for detecting the emitted signal, the detection time of the emitted signal being determined in a local time reference frame;
   means for transmitting an outbound time synchronization signal to a reference communication device;
   second receiver means for receiving a reply time synchronization signal from the reference communication device, the reply time synchronization signal indicating a time of arrival of the outbound time synchronization signal at the reference communication device in a time reference frame of the reference communication device;
   means for determining a timing difference between the local time reference frame and the time reference frame of the reference communication device based on a round-trip signal propagation time determined from exchanging the outbound and reply time synchronization signals between the mobile communication device and the reference communication device; and
   means for accounting for the timing difference such that the detection time of the emitted signal is determined in the time reference frame of the reference communication device.

47. The communication device of claim 46, wherein said first and second receiver means comprises a receiver capable of detecting both the emitted signal from the emitter and the reply time synchronization signal from the reference communication device.

48. The communication device of claim 46, wherein said means for determining determines the timing difference from a time of transmission of the outbound time synchronization signal, the time of arrival of the outbound time synchronization signal at the reference communication device, and the signal propagation time.

49. The communication device of claim 46, wherein said communication device exchanges time synchronization signals with the reference communication device using a Carrier Sense Multiple Access with Collision Avoidance (CSMA/CA) protocol.

50. The communication device of claim 46, wherein said communication device exchanges time synchronization signals with the reference communication device using spread spectrum waveforms.

51. The communication device of claim 46, wherein said means for accounting adjusts the detection time of the emitted signal by the timing difference between the local time reference frame and the time reference frame of the reference communication device.

52. The communication device of claim 46, wherein said means for accounting adjusts the local time reference frame by the timing difference to synchronize the local time reference frame with the time reference frame of the reference communication device.

53. The communication device of claim 46, wherein said means for accounting accounts for the timing difference between the local time reference frame and the time reference frame of the reference communication device upon detection of the emitted signal.

54. The communication device of claim 53, wherein, each time an emitted signal is detected by said communication device, said means for accounting synchronizes the detection time of the emitted signal with the time reference frame of the reference communication device.

55. The communication device of claim 46, wherein said means for accounting accounts for the timing difference when a predetermined period of time has elapsed since the communication device last accounted for the timing difference.

56. The communication device of claim 46, wherein said means for accounting accounts for the timing difference when an estimated accuracy of the local time reference frame is worse than a predetermined value.

57. The communication device of claim 46, wherein said communication device periodically synchronizes the local time reference frame with the time reference frame of the reference communication device.

58. The communication device of claim 46, wherein the frequency with which said communication device accounts for the timing difference is a function of a level of activity in a communication network used to exchange signals between said communication device and the reference communication device.

59. A reference communication device for establishing a common time reference frame among a plurality of mobile receiver communication devices, comprising:
   a receiver configured to receive outbound time synchronization signals transmitted by respective ones of said mobile receiver communication devices, said reference communication device determining a time of arrival of the outbound time synchronization signals in the common time reference frame;
   a transmitter configured to transmit reply time synchronization signals to said respective ones of said mobile receiver communication devices, the reply time synchronization signals indicating the time of arrival of the respective outbound time synchronization signals at the reference communication device in the common time reference frame and enabling said respective ones of the mobile receiver communication devices to synchronize with the common time reference frame based on a round-trip signal propagation time determined from exchanging the outbound and reply time synchronization signals with the reference communication device, wherein the reference communication device is a mobile communication device.

60. The reference communication device of claim 59, wherein said transmitter transmits the reply time synchronization signals at a predetermined turn-around time after arrival of the respective outbound time synchronization signals.

61. The reference communication device of claim 59, wherein said transmitter indicates in the reply time synchronization signals a time of transmission of the reply time synchronization signals.

62. The reference communication device of claim 59, wherein said transmitter indicates in the reply time synchronization signals a turn around time between the time of transmission of the reply time synchronization signals and the time of arrival of the respective outbound time synchronization signals.

63. The reference communication device of claim 59, wherein said reference communication device exchanges time synchronization signals with the receiver communication devices using a Carrier Sense Multiple Access with Collision Avoidance (CSMA/CA) protocol.

64. The reference communication device of claim 59, wherein said reference communication device exchanges time synchronization signals with the receiver communication devices using spread spectrum waveforms.

65. The reference communication device of claim 59, wherein said reference communication device further comprises a low accuracy clock that maintains the common time reference frame.

66. A reference communication device for establishing a common time reference frame among a plurality of mobile receiver communication devices, comprising:

means for receiving outbound time synchronization signals transmitted by respective ones of said mobile receiver communication devices, said reference communication device determining a time of arrival of the outbound time synchronization signals in the common time reference frame;

means for transmitting reply time synchronization signals to said respective ones of said mobile receiver communication devices, the reply time synchronization signals indicating the time of arrival of the respective outbound time synchronization signals at the reference communication device in the common time reference frame and enabling said respective ones of the mobile receiver communication devices to synchronize with the common time reference frame based on a round-trip signal propagation time determined from exchanging the outbound and reply time synchronization signals with the reference communication device, wherein the reference communication device is a mobile communication device.

67. The reference communication device of claim 66, wherein said means for transmitting transmits the reply time synchronization signals at a predetermined turn-around time after arrival of the respective outbound time synchronization signals.

68. The reference communication device of claim 66, wherein said means for transmitting indicates in the reply time synchronization signals a time of transmission of the reply time synchronization signals.

69. The reference communication device of claim 66, wherein said means for transmitting indicates in the reply time synchronization signals a turn around time between the time of transmission of the reply time synchronization signals and the time of arrival of the respective outbound time synchronization signals.

70. A system for determining the position of an emitter, comprising:

a reference communication device maintaining a time reference frame;

a plurality of receiver communication devices positioned at different locations and configured to detect an emitted signal from the emitter, the receiver communication devices determining respective detection times of the emitted signal in respective local time reference frames, exchanging time synchronization signals with said reference communication device to determine respective timing differences between the respective local time reference frames and the time reference frame of said reference communication device based on a round-trip signal propagation time, and accounting for the respective timing differences such that the respective detection times of the emitted signal at the receiver communication devices are in a common time reference frame, wherein at least one of the receiver communication devices is a mobile communication device; and a processor configured to receive signal detection information from the receiver communication devices, including the respective detection times, said processor correlating the signal detection information from at least three of the receiver communication devices to a common emitted signal and determining a position of the emitter from known positions of the receiver communication devices and the respective detection times of the common emitted signal.

71. The system of claim 70, wherein each of said receiver communication devices transmits an outbound time synchronization signal to the reference communication device and said reference communication device transmits a reply time synchronization signal to each of said receiver communication devices.

72. The system of claim 71, wherein the reply time synchronization signal indicates a time of arrival of the outbound time synchronization signal at the reference communication device in the time reference frame of the reference communication device.

73. The system of claim 71, wherein each of said receiver communication devices determines its respective timing difference from a time of transmission of the outbound time synchronization signal, a time of arrival of the outbound time synchronization signal at the reference communication device, and the signal propagation time.

74. The system of claim 70, wherein said receiver communication devices exchange time synchronization signals with the reference communication device using a Carrier Sense Multiple Access with Collision Avoidance (CSMA/CA) protocol.

75. The system of claim 70, wherein said receiver communication devices exchange time synchronization signals with the reference communication device using spread spectrum waveforms.

76. The system of claim 70, wherein said receiver communication devices adjust the respective detection times by the respective timing differences between the respective local time reference frames and the time reference frame of the reference communication device.

77. The system of claim 70, wherein said receiver communication devices adjust the respective local time reference frames by the respective timing differences to synchronize the respective local time reference frames with the common time reference frame.

78. The system of claim 70, wherein said receiver communication devices account for the respective timing differences between the respective local time reference frames and the time reference frame of the reference communication device upon detection of an emitted signal.

79. The system of claim 78, wherein said receiver communication devices synchronize the respective detection times with the common time reference frame each time an emitted signal is detected.

80. The system of claim 78, wherein said receiver communication devices account for the respective timing differences when a predetermined period of time has elapsed since respective receiver communication devices last accounted for the respective timing differences.

81. The system of claim 70, wherein said receiver communication devices account for the respective timing differences when an estimated accuracy of the respective local time reference frames is worse than a predetermined value.

82. The system of claim 70, wherein said receiver communication devices periodically synchronize the respective local time reference frames with the time reference frame of the reference communication device.

83. The system of claim 70, wherein the frequency with which said receiver communication devices account for the respective timing differences is a function of a level of activity in a communication network used to exchange signals between the receiver communication devices and the reference communication device.

84. The system of claim 70, wherein the receiver communication devices include low accuracy clocks that maintain the respective local time reference frames.

85. The system of claim 70, wherein at least three receiver communication devices detect the emitted signal.

86. The system of claim 70, wherein said processor determines the position of the emitter using trilateration.

87. The system of claim 70, wherein said processor is coupled to one of the receiver communication devices.

88. The system of claim 70, wherein said processor is coupled to the reference communication device.

89. The system of claim 70, wherein the reference communication device is one of the receiver communication devices.

90. The system of claim 70, wherein all of the receiver communication devices are mobile.

91. The system of claim 70, wherein the reference communication device is mobile.

92. The system of claim 70, wherein the receiver communication devices are handheld radios.

93. The system of claim 70, wherein the receiver communication devices are wireless telephones.

94. The system of claim 70, wherein the receiver communication devices operate onboard a moving vehicle.

95. A system for determining the position of an emitter, comprising:
    means for detecting an emitted signal from the emitter at plural locations wherein the means for detecting are mobile, said means for detecting determining respective detection times of the emitted signal at the plural known locations in respective local time reference frames;
    means for determining respective timing differences between the respective local time reference frames and a common time reference frame device based on a round-trip signal propagation time determined from exchanging time synchronization signals between the means for detecting and a reference communication device;
    means for accounting for the respective timing differences between the respective local time reference frames and the common time reference frame such that the respective detection times are determined in the common time reference frame; and
    means for determining a position of the emitter from the plural locations and the respective detection times of the emitted signal.

* * * * *